(12) United States Patent
Choi et al.

(10) Patent No.: US 9,031,731 B2
(45) Date of Patent: May 12, 2015

(54) APPARATUS AND METHOD FOR PARKING ASSISTANCE

(71) Applicant: Hyundai Motor Company, Seoul (KR)

(72) Inventors: Jae Seob Choi, Gyeonggi-do (KR); Dae Joong Yoon, Gyeonggi-do (KR); Eu Gene Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/012,067

(22) Filed: Aug. 28, 2013

(65) Prior Publication Data
US 2014/0309834 A1    Oct. 16, 2014

(30) Foreign Application Priority Data
Apr. 15, 2013    (KR) .......................... 10-2013-0040865

(51) Int. Cl.
*G01C 22/00*    (2006.01)
*B62D 15/02*    (2006.01)

(52) U.S. Cl.
CPC .................................. *B62D 15/0285* (2013.01)

(58) Field of Classification Search
CPC ........................................................ G01C 21/00
USPC .............................. 701/23, 301; 340/436, 438
See application file for complete search history.

(56) References Cited

U.S. PATENT DOCUMENTS

2006/0287826 A1*  12/2006  Shimizu et al. ............... 701/216
2013/0085636 A1   4/2013   You et al.

FOREIGN PATENT DOCUMENTS

| JP | 2003252150 A | 9/2003 |
| JP | 2009-129096 A | 6/2009 |
| JP | 2009202609 A | 9/2009 |
| JP | 2010137857 A | 6/2010 |
| JP | 2010202018 A | 9/2010 |
| KR | 10-2013-0036431 A | 4/2013 |

* cited by examiner

*Primary Examiner* — Thomas G Black
*Assistant Examiner* — Luke Huynh
(74) *Attorney, Agent, or Firm* — Mintz Levin Cohn Ferris Glovsky and Popeo, P.C.; Peter F. Corless

(57) ABSTRACT

An apparatus and a method for parking assistance is provided that include a controller configured to determine an intention to park based on vehicle condition information and environmental information. In addition, the controller is configured to set a parking mode of a vehicle by analyzing the direction of the vehicle and a gear position, when the vehicle stops in an area in response to determining that the vehicle is to be parked. Furthermore, the controller is configured to assist the vehicle in automatic parking into a target parking lot based on the set parking mode.

18 Claims, 8 Drawing Sheets

APPARATUS AND METHOD FOR PARKING ASSISTANCE

CROSS-REFERENCE TO RELATED APPLICATION

This application is based on and claims priority from Korean Patent Application No. 10-2013-0040865, filed on Apr. 15, 2013 in the Korean Intellectual Property Office, the disclosure of which is incorporated herein in its entirety by reference.

BACKGROUND

1. Field of the Invention

The present invention relates to an apparatus and a method for parking assistance, and more particularly, to an apparatus and a method that determines user intention to park and a parking mode.

2. Description of the Prior Art

In general, a parking assist system such as a smart parking assist system (SPAS) essentially requires a parking mode determination step and a parking space search step to be performed in advance. In particular, a driver must select a parking mode in the conventional systems and when a parking space is small (e.g., compared to the size of the vehicle) or a substantial amount of vehicles are near the driver's vehicle, it is difficult to obtain searching distance and the searching time increases. Further, while searching a space for parking, another vehicle may take the parking space, showing that there is the time difference between an automatic parking system and manually parking performed by a driver.

SUMMARY

Accordingly, the present invention provides an apparatus and a method for parking assistance that determines a driver's intention to park before performing parking control in a target parking lot and recognizes a parking mode based on the location and condition of a vehicle.

In one aspect of the present invention, an apparatus for parking assistance is provided that may include a plurality of units executed by a controller having a processor and a memory. The plurality of units may include: a parking intention determining unit that determines a driver's intention to park based on condition information of a vehicle and environmental information; a parking mode setting unit that sets a parking mode of a vehicle by analyzing the direction of the vehicle and a gear position, when the vehicle stops in an area when it is determined that the vehicle is to be parked; and a parking assist unit that assists the vehicle in automatic parking in a target parking lot based on the set parking mode.

The parking intention determining unit may be configured to determine that the driver intends to park in an area when a parking line is sensed in the vicinity of the vehicle. In addition, the parking intention determining unit may be configured to determine that the driver intends to park in an area when the vehicle travels at a substantially low speed which is less than a threshold speed, when parking lot information in the vicinity of the area is detected.

The parking mode setting unit may be configured to set the parking mode to a head-on parking mode when the vehicle is directed towards a parking lot occupied by the vehicle and a gear is in the drive (D) position, when the vehicle is stopped. In addition, the parking mode setting unit may be configured to set the parking mode to a reverse parking mode when the vehicle is directed towards the opposite direction of a parking lot occupied by the vehicle and a gear is in the reverse (R) position, when it is determined that the vehicle is to be parked and the vehicle is stopped at an area.

The apparatus may further include a target parking lot setting unit that sets, as the target parking lot, the parking lot occupied by the vehicle at the time of setting the parking mode or a parking lot selected by the driver.

In another aspect of the present invention, a method for parking assistance is provided that may include: determining a driver's intention to park based on condition information of a vehicle and surrounding information; setting a parking mode of a vehicle by analyzing the direction of the vehicle and a gear position, when the vehicle stops in an area when it is determined that the vehicle is to be parked; and assisting the vehicle in automatic parking in a target parking lot based on the set parking mode.

The determining of the driver's intention to park may include determining that the driver intends to park in an area when a parking line is sensed near the vehicle. In addition, the determining of the driver's intention to park may include determining that the driver intends to park in an area when the vehicle travels at a substantially low speed which is less than a threshold speed, when parking lot information near the area is detected by a navigator.

The setting of the parking mode may include setting the parking mode to a head-on parking mode when the vehicle is directed towards a parking lot occupied by the vehicle and a gear is in the D position, when the vehicle is stopped. In addition, the setting of the parking mode may include setting the parking mode to a reverse parking mode when the vehicle is directed towards the opposite direction of a parking lot occupied by the vehicle and a gear is in the R position, when it is determined that the vehicle is to be parked and the vehicle is stopped at an area.

The method may further include setting, as the target parking lot, the parking lot occupied by the vehicle at the time of setting the parking mode or a parking lot selected by the driver, prior to the assisting of the vehicle in automatic parking.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, embodiments of the present invention will be described with reference to the accompanying drawings.

Figure 1:
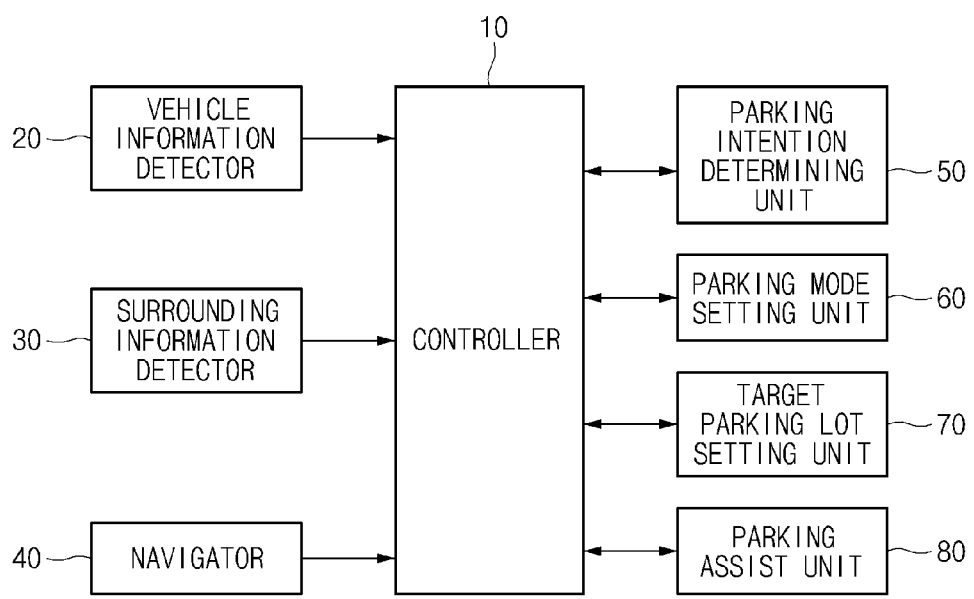
FIG. 1 is an exemplary diagram illustrating the configuration of an apparatus for parking assistance according to an exemplary embodiment of the present invention.

FIG. 1 is an exemplary diagram illustrating the configuration of an apparatus for parking assistance according to an exemplary embodiment of the present invention. Referring to FIG. 1, an apparatus for parking assistance according to an exemplary embodiment of the present invention may include vehicle information detector 20, surrounding information detector 30, a navigator 40, and a plurality of units executed by a controller 10. The plurality of units may include a parking intention determining unit 50, a parking mode setting unit 60, a target parking lot setting unit 70, and a parking assist unit 80. The vehicle information detector 20 may be configured to sense vehicle information such as vehicle condition information including gear position information, traveling speed information and traveling direction information using sensors installed within the vehicle. The surrounding information detector 30 may be configured to sense information around a vehicle such as adjacent vehicles and parking lots using sensors and an imaging device (e.g., a camera) installed extraneous to the vehicle. In addition, the navigator 40 may be configured to provide information regarding a vehicle's location and map information around the vehicle using a global positioning system (GPS) satellite communication. In particular, the navigator 40 may be configured to provide information regarding parking lots around a vehicle.

The parking intention determining unit 50 may be configured to determine when a driver has intention to park based on the information acquired by the vehicle information detector 20, the surrounding information detector 30 and a navigator 40. For example, the parking intention determining unit 50 may be configured to determine that a driver intends to park in an area when a parking line is sensed around his vehicle. Additionally, the parking intention determining unit 50 may be configured to determine that a driver is attempting to park in an area when parking lot information around the area is detected by a navigator and the vehicle travels at a speed less than a threshold speed.

The parking mode setting unit 60 may be configured to rapidly set a parking mode based on the vehicle's condition when the parking intention determining unit 50 determines that the vehicle is to be parked. In other words, the parking mode setting unit 60 may be configured to set the parking mode of a vehicle by analyzing the direction of the vehicle and the position of the gear when the vehicle stops in a certain location when it is determined that the vehicle is to be parked. As an example, when a vehicle to be parked stops in a certain location, the parking mode setting unit 60 may be configured to set the vehicle's parking mode to a head-on parking mode when the vehicle directed towards a parking lot occupied by the vehicle and a gear is in D position. Additionally, even when a vehicle stops in a certain location when it is determined that the vehicle is to be parked and the vehicle is directed towards a parking lot occupied by the vehicle, the parking mode setting unit 60 may be configured to wait to set the vehicle's parking mode when the gear is not in D position.

On the other hand, when a vehicle stops in a certain location when it is determined that the vehicle is to be parked, the parking mode setting unit 60 may be configured to set the vehicle's parking mode to a reverse parking mode when the vehicle is directed toward the opposite direction of a parking lot occupied by the vehicle and a gear is in R position. In this case, when a vehicle stops in a certain location when it is determined that the vehicle is to be parked and even when the vehicle is directed toward the opposite direction of a parking lot occupied by the vehicle, the parking mode setting unit 60 may be configured to wait to set the vehicle's parking mode when the gear is not in R position. In particular, the parking lot occupied by a vehicle may be the parking lot actually occupied by the vehicle, or it may be determined that the parking lot is occupied by the vehicle when the parking lot is located within a certain range from the vehicle.

The operations of setting a parking mode will be described with reference to FIGS. 3A and 3B and 4A and 4B in detail.

The target parking lot setting unit 70 may be configured to set the parking lot occupied by a vehicle as the target parking lot after the parking mode is set by the parking mode setting unit 60. It may be apparent that when a driver selects a parking lot, the target parking lot setting unit 70 may also be configured to set the parking lot selected by the driver as the target parking lot. Once the parking mode and the target parking lot are set, the parking assist unit 80 may be configured to assist in automatic parking of the vehicle while parking in the target parking lot based on a predetermined parking mode. The automatic parking may be assisted by any algorithm well known in the art, and thus a detailed description thereon is omitted.

Figure 2:
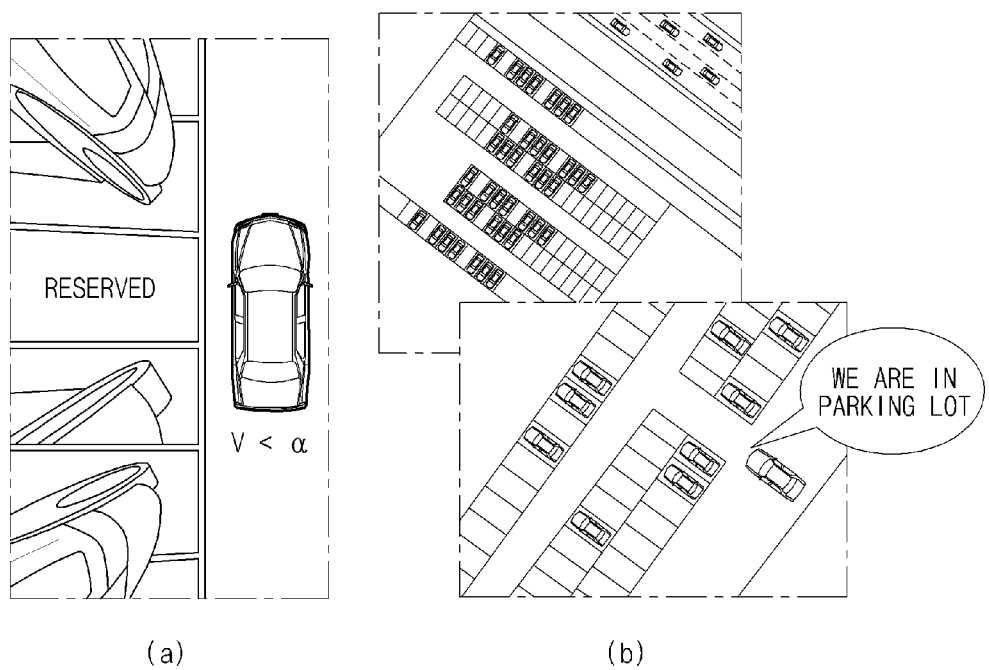
FIGS. 2A and 2B are exemplary diagrams illustrating operations of determining the intention to park by a parking assist apparatus according to an exemplary embodiment of the present invention.

FIGS. 2A and 2B are exemplary diagrams illustrating operations of determining parking intention by an apparatus for parking assistance according to an exemplary embodiment of the present invention. Referring to FIG. 2A, an apparatus for parking assistance may be configured to determine that a vehicle is to be parked when a parking line is sensed and the vehicle is traveling at a low speed that is less than a threshold speed. Further, even when no parking line is sensed near the vehicle as shown in FIG. 2A, when it is detected that a parking lot is in the vicinity of (e.g., near) the vehicle by a navigator 40 and the vehicle travels at a low speed that is less than a threshold speed as shown in FIG. 2B, the apparatus for parking assistance may be configured to determine that the vehicle is to be parked.

Although not shown in FIGS. 2A and 2B, the apparatus for parking assistance may be configured to determine that the vehicle is to be parked when other information relating to parking is detected near the vehicle and the vehicle travels below a reference speed.

Figure 3:
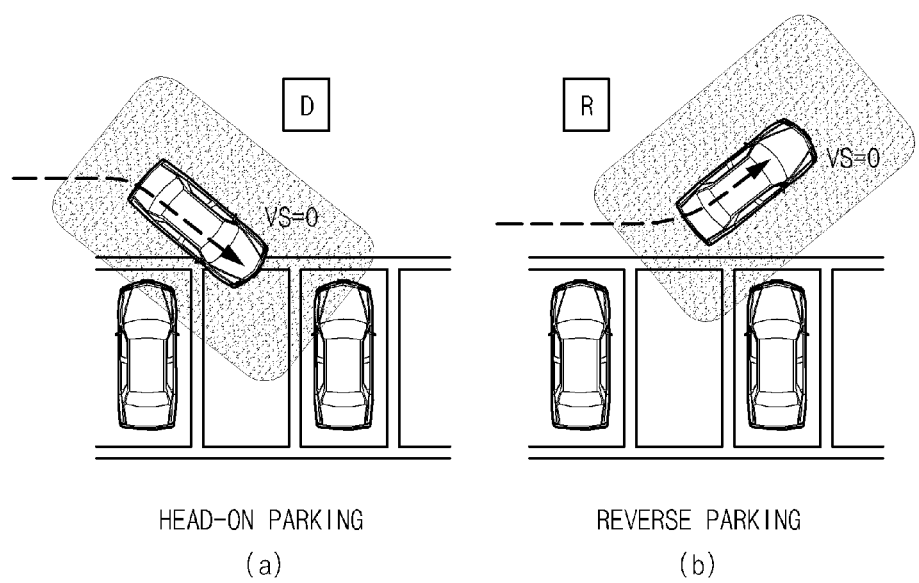
FIGS. 3A and 3B and FIGS. 4A and 4B are exemplary diagrams illustrating operations of determining parking modes by a parking assist apparatus according to an exemplary embodiment of the present invention.

FIGS. 3A and 3B and FIGS. 4A and 4B are exemplary diagrams illustrating operations of determining parking modes by an apparatus for parking assistance according to an exemplary embodiment of the present invention. Referring to FIG. 3A, when a traveling vehicle stops while the front of the vehicle is within a parking lot, the apparatus for parking assistance may be configured to determine that the vehicle is to be parked in the occupied parking lot. In particular, the apparatus for parking assistance may be configured to set the vehicle's parking mode to a head-on parking mode when the vehicle is directed toward the parking lot and the gear is in the D position.

In contrast, referring to FIG. 3B, when a traveling vehicle stops while the rear of the vehicle is directed toward a parking lot, the apparatus for parking assistance, when it is determined that a part of the vehicle is within the parking lot, may be configured to determine that the vehicle is to be parked in that particular parking lot. In particular, the apparatus for parking assistance may be configured to set the vehicle's parking mode to a reverse parking mode when the vehicle is directed toward the opposite of the occupied parking lot and the gear is in the R position.

Figure 4:
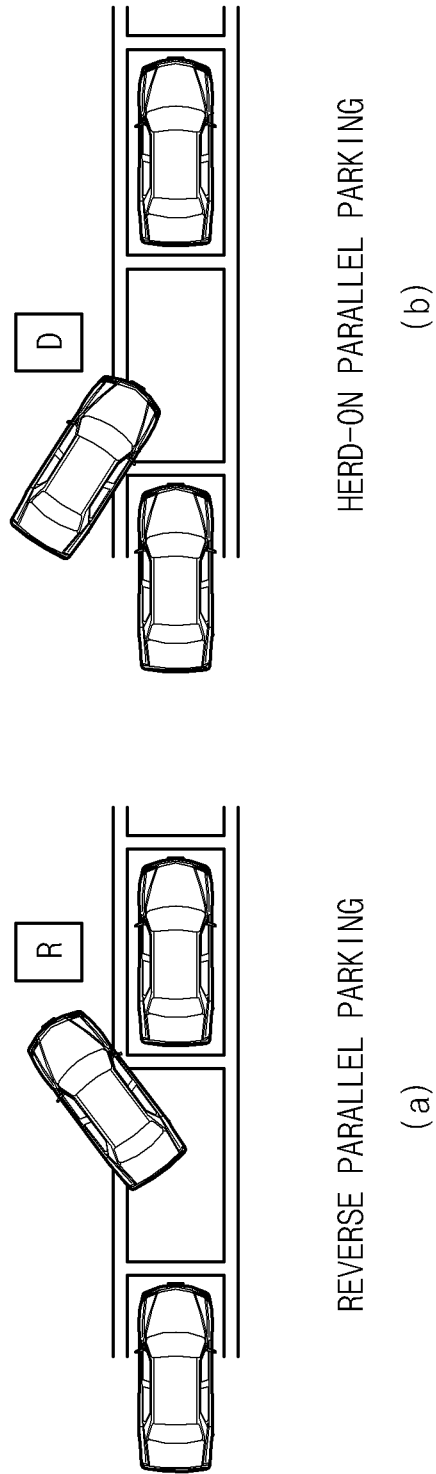

Although FIGS. 3A and 3B illustrate the examples of standard parking, the apparatus for parking assistance may also be configured to set the parking mode for parallel parking as shown in FIGS. 4A and 4B, based on the direction in which a vehicle is heading, a parking lot occupied by the vehicle and the gear position of the vehicle. In other words, as shown in FIG. 4A, the apparatus for parking assistance may be configured to set the vehicle's parking mode to a reverse parking mode when the vehicle is directed toward the opposite of the occupied parking lot and the gear is in the R position. Further, as shown in FIG. 4B, the apparatus for parking assistance may be configured to set the vehicle's parking mode to a head-on parking mode when the vehicle is directed toward the occupied parking lot and the gear is in the D position.

As shown in FIGS. 3A and 3B and FIGS. 4A and 4B, the parking mode of a vehicle may be set based on the direction of the vehicle relative to a parking lot and the gear position of the vehicle without a driver's selection, such that parking assistance may be rapidly implemented.

Figure 5:
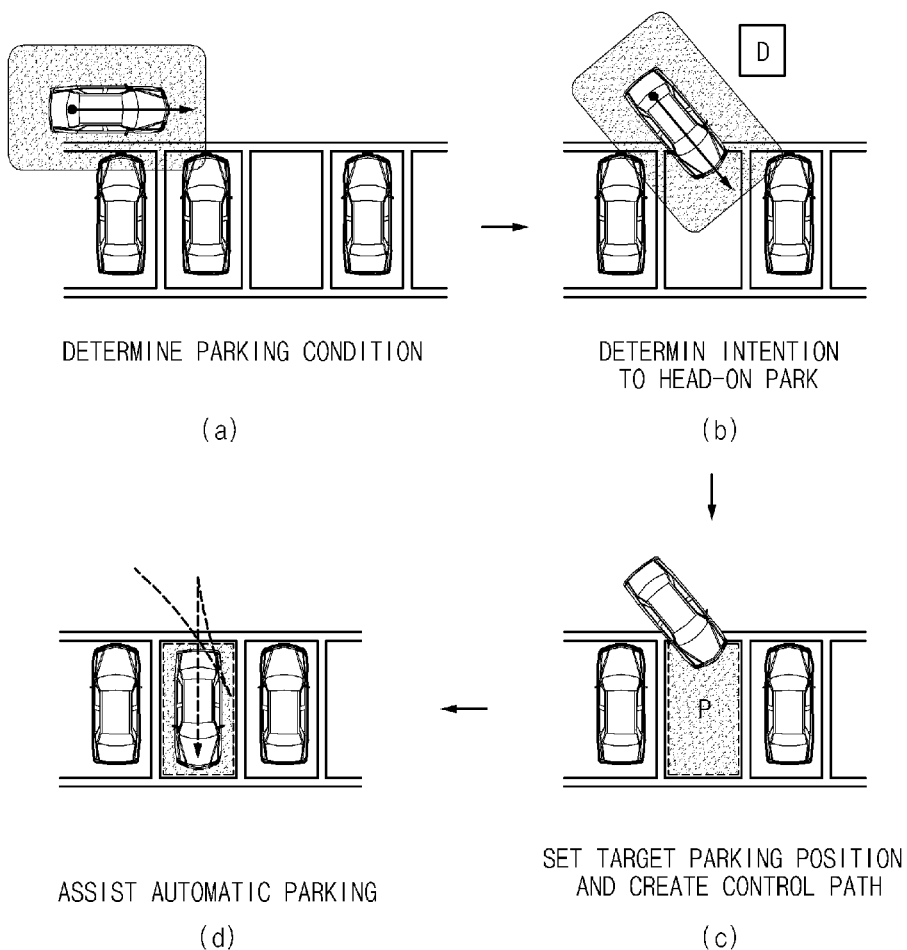
FIGS. 5A to 5D and FIGS. 6A to 6D are exemplary diagrams illustrating an operation of parking assist based on a parking mode by a parking assist apparatus according to an exemplary embodiment of the present invention.
Figure 6:
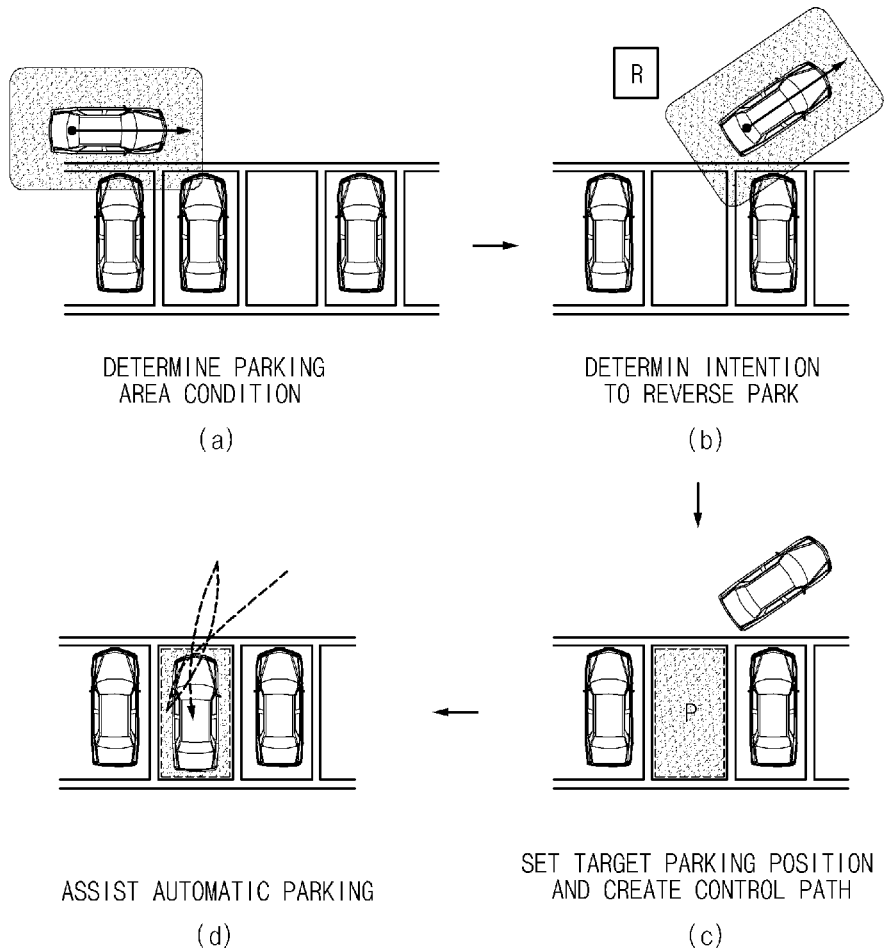

FIGS. 5 and 6 are exemplary diagrams illustrating an operation of parking assistance based on parking modes by an apparatus for parking assistance according to an exemplary embodiment of the present invention. First, FIG. 5 illustrates an operation in a head-on parking mode. As shown in FIG. 5A, when a parking line is sensed and a vehicle travels below a threshold speed (e.g., at a speed less than the threshold speed), the apparatus may be configured to determine that the vehicle is to be parked. Then, as shown in FIG. 5B, when the front of the vehicle is within the parking lot and stops, i.e., the vehicle is directed toward the parking lot and the gear is in the D position, the apparatus for parking assistance may be configured to set a parking mode to a head-on parking mode. When a target parking lot is set as shown in FIG. 5C, the apparatus for parking assistance may be configured to calculate the trajectory of the head-on parking based on the locations of the vehicle and the target parking lot using a parking assist algorithm, and automatic parking may be assisted based on the calculated trajectory as shown in FIG. 5D.

Furthermore, FIG. 6 illustrates an exemplary operation in a reverse parking mode. As shown in FIG. 6A, when a parking line is sensed and a vehicle travels below a threshold speed, the apparatus may be configured to determine that the vehicle is to be parked. Then, as shown in FIG. 6B, when a part of the vehicle is within the parking lot and stops, i.e., the vehicle is directed toward the opposite of the parking lot and the gear is in the R position, the apparatus for parking assistance may be configured to set a parking mode to a reverse parking mode. When a target parking lot is set as shown in FIG. 6C, the apparatus for parking assistance may be configured to calculate the trajectory of the reverse parking based on the locations of the vehicle and the target parking lot using a parking assist algorithm, and automatic parking may be assisted based on the calculated trajectory as shown in FIG. 6D.

Figure 7:
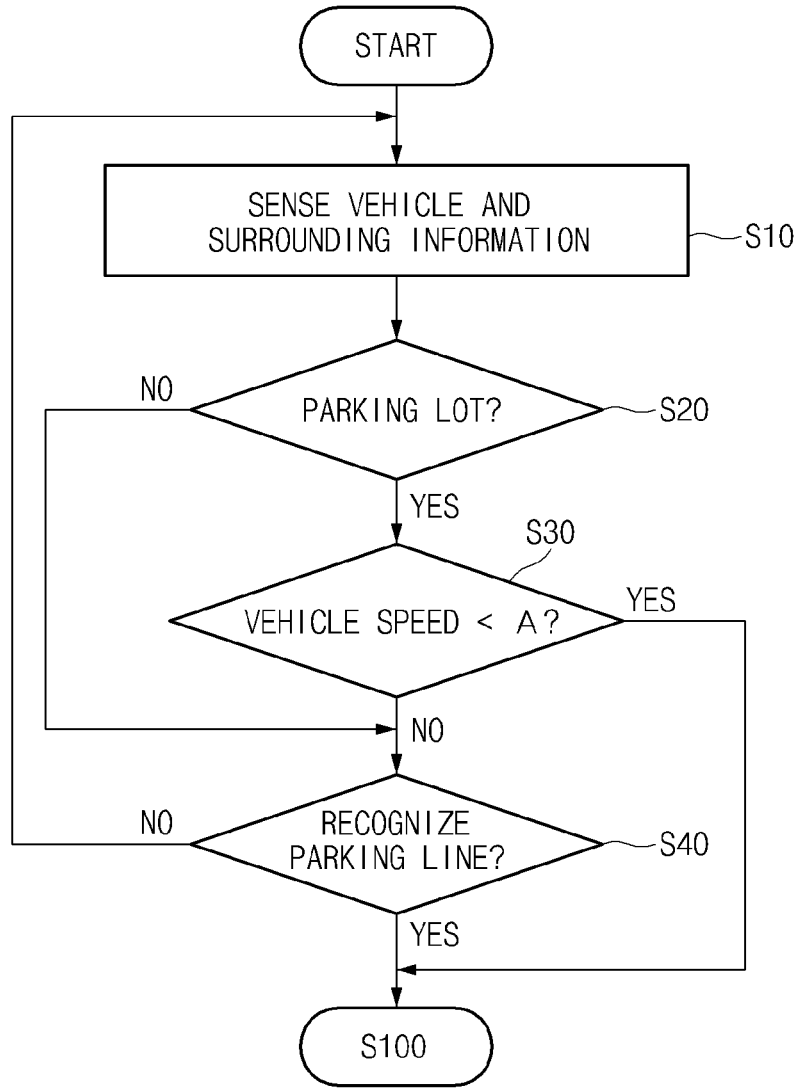
FIGS. 7 and 8 are exemplary flow charts illustrating operational flows of a method for parking assist according to an exemplary embodiment of the present invention.
Figure 8:
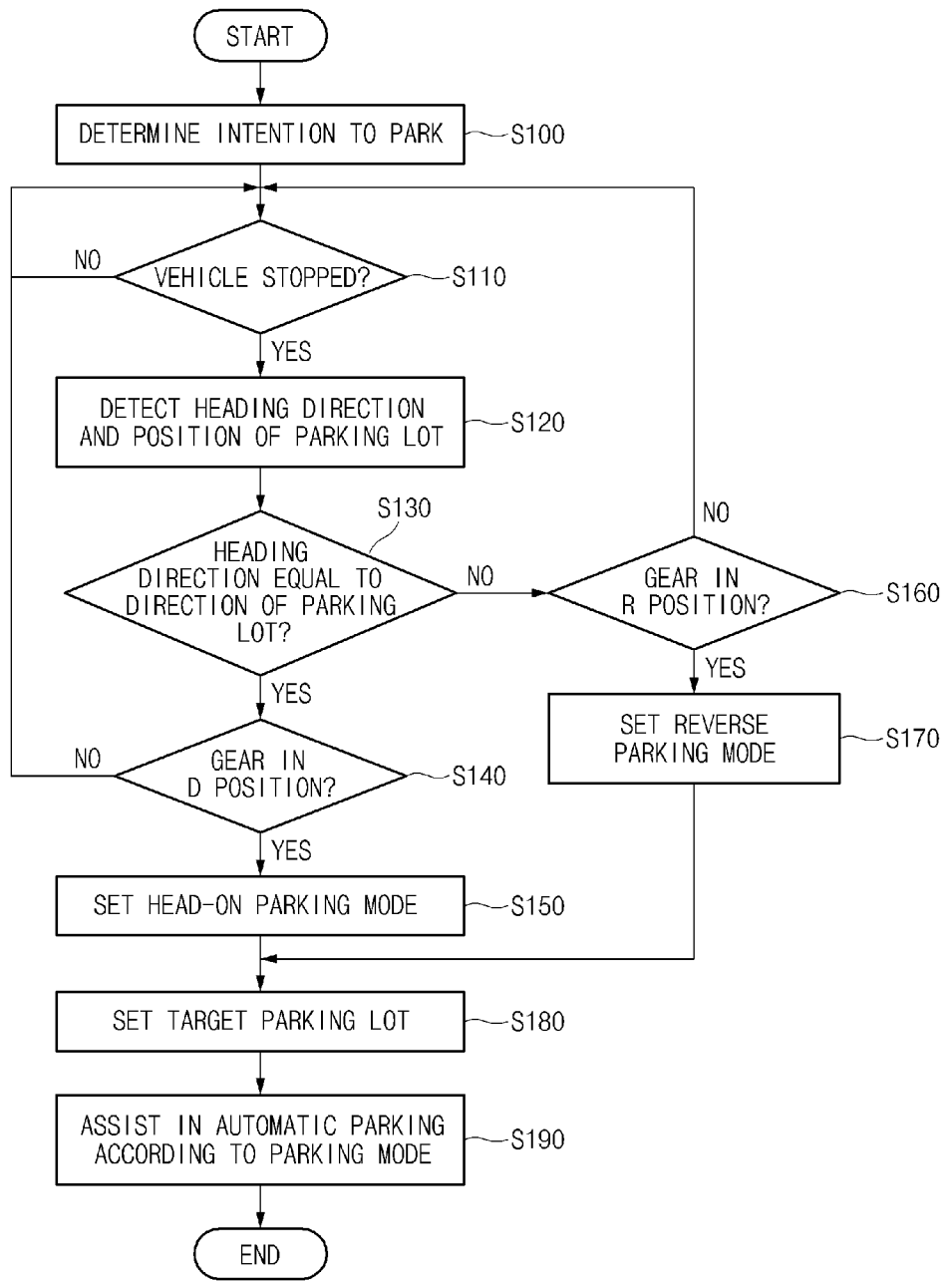

Now, the operation of the apparatus for parking assistance according to the exemplary embodiment of the present invention will be described below in detail. FIGS. 7 and 8 are exemplary flow charts illustrating operation flows of a method for parking assistance according to an exemplary embodiment of the present invention.

First, FIG. 7 illustrates an operation of determining a driver's parking intention. As illustrated in FIG. 7, the apparatus for parking assistance may be configured to sense vehicle information and surrounding information using an imaging device (e.g., a camera), sensors, a navigator and the like installed within a vehicle (S10). When the vehicle is near (e.g., in the vicinity of) a parking lot and the speed of the vehicle is below a threshold speed 'A', or a parking line is sensed near the vehicle, the process proceeds to S100 of FIG. 8 in which a parking intention is determined. Otherwise, it may be determined that the driver is not intending to park and operations S10 to S40 are repeated.

As shown in FIG. 8, once a parking intention is determined (S100) through operations S10 to S40, the apparatus for parking assistance may be configured to determine when the vehicle is stopped (S110). In response to determining that the vehicle is stopped, the direction in which the vehicle is heading and the location of the parking lot may be determined (S120), to set a parking mode.

When the vehicle is directed toward the parking lot (S130) and the gear is in the D position (S140), the apparatus may be configured to set a head-on parking mode (S150). When the gear is not in the D position in S140, the process returns to S110. Furthermore, when the vehicle is directed toward opposite of the parking lot (S130) and the gear is in the R position (S160), the apparatus may be configured to set a reverse parking mode (S170). When the gear is not in the R position in S160, the process returns to S110.

Once the parking mode of the vehicle is set through S150 to S170, the apparatus maybe configured to set a target parking lot (S180), and assist the automatic parking of the vehicle into the target parking lot based on the parking mode set though S150 to S170 (S190).

As set forth above, according to the embodiment of the present invention, a driver's intention to park may be determined before performing parking control in a target parking lot and a parking mode may be rapidly recognized based on the location and condition of a vehicle. Although the apparatus and the method for parking assistance according to the exemplary embodiments of the present invention have been described with reference to the accompanying drawings, the present invention is not limited to the embodiment and the accompanying drawings disclosed in the present specification, but may be modified without departing from the scope and spirit of the present invention.

What is claimed is:

1. An apparatus for parking assistance, comprising:
a controller configured to:
determine an intention to park based on at least two traveling speeds of a vehicle, surrounding information, and whether the vehicle is within a parking lot;
set a parking mode of the vehicle by analyzing a direction in which the vehicle is heading and a gear position, when the vehicle stops in an area in response to determining that the vehicle is to be parked; and
assist the vehicle in automatic parking into a target parking lot based on the set parking mode.

2. The apparatus according to claim 1, wherein the controller is further configured to determine the intention to park in an area when a parking line is sensed in the vicinity of the vehicle.

3. The apparatus according to claim 1, wherein the controller is further configured to determine the intention to park in the area when the vehicle travels at a speed less than a threshold speed, when parking lot information in the vicinity of the area is detected.

4. The apparatus according to claim 1, wherein the controller is further configured to set the parking mode to a head-on parking mode when the vehicle is directed toward the parking lot occupied by the vehicle and the gear is in a drive (D) position, when the vehicle is stopped.

5. The apparatus according to claim 1, wherein the controller is further configured to set the parking mode to a reverse parking mode when the vehicle is directed toward the opposite direction of the parking lot occupied by the vehicle and the gear is in a reverse (R) position, in response to determining that the vehicle is to be parked and the vehicle is stopped at the area.

6. The apparatus according to claim 1, wherein the controller is further configured to set the parking lot occupied by the vehicle as the target parking lot at the time of setting the parking mode or a selected parking lot selected.

7. A method for parking assistance, comprising:
determining, by a controller, an intention to park based on at least two traveling speeds of a vehicle, surrounding information, and whether the vehicle is within a parking log;
setting, by the controller, a parking mode of the vehicle by analyzing a direction in which the vehicle is heading and a gear position, when the vehicle stops in an area in response to determining that the vehicle is to be parked; and
assisting, by the controller, the vehicle in automatic parking into a target parking lot based on the set parking mode.

8. The method according to claim 7, wherein the determining of the intention to park includes determining, by the controller, the intention to park in the area when a parking line is sensed near the vehicle.

9. The method according to claim 7, wherein the determining of the intention to park includes determining, by the controller, the intention to park in the area when the vehicle travels at a speed less than a threshold speed, when parking lot information near the area is detected by a navigator.

10. The method according to claim 7, wherein the setting of the parking mode includes setting, by the controller, the parking mode to a head-on parking mode when the vehicle is directed toward the parking lot occupied by the vehicle and the gear is in the drive (D) position, when the vehicle is stopped.

11. The method according to claim 7, wherein the setting of the parking mode includes setting, by the controller, the parking mode to a reverse parking mode when the vehicle is directed toward the opposite direction of the parking lot occupied by the vehicle and the gear is in the reverse (R) position, in response to determining that the vehicle is to be parked and the vehicle is stopped at the area.

12. The method according to claim 7, further comprising:
setting, by the controller, the parking lot occupied by the vehicle as the target parking lot at the time of setting the parking mode or a selected parking lot selected, prior to the assisting of the vehicle in automatic parking.

13. A non-transitory computer readable medium containing program instructions executed by a processor or controller, the computer readable medium comprising:
program instructions that determine an intention to park based on at least two traveling speeds of a vehicle, surrounding information, and whether the vehicle is within a parking lot;
program instructions that set a parking mode of the vehicle by analyzing a direction in which the vehicle is heading and a gear position, when the vehicle stops in an area in response to determining that the vehicle is to be parked; and
program instructions that assist the vehicle in automatic parking into a target parking lot based on the set parking mode.

14. The non-transitory computer readable medium of claim 13, further comprising:
program instructions that determine the intention to park in the area when the vehicle travels at a speed less than a threshold speed, when parking lot information in the vicinity of the area is detected.

15. The non-transitory computer readable medium of claim 13, further comprising:
program instructions that sense a parking line in the vicinity of the vehicle.

16. The non-transitory computer readable medium of claim 13, further comprising:
program instructions that set the parking mode to a head-on parking mode when the vehicle is directed toward the parking lot occupied by the vehicle and the gear is in a drive (D) position, when the vehicle is stopped.

17. The non-transitory computer readable medium of claim 13, further comprising:
program instructions that set the parking mode to a reverse parking mode when the vehicle is directed toward the opposite direction of the parking lot occupied by the vehicle and the gear is in a reverse (R) position, in response to determining that the vehicle is to be parked and the vehicle is stopped at the area.

18. The non-transitory computer readable medium of claim 13, further comprising:
program instructions that set the parking lot occupied by the vehicle as the target parking lot at the time of setting the parking mode or a selected parking lot selected.

* * * * *